US005513404A

United States Patent [19]

Kanai

[11] Patent Number: 5,513,404

[45] Date of Patent: May 7, 1996

[54] EXCRETION APPARATUS COMBINED INTO A BED FOR BEDRIDDEN PERSON

[75] Inventor: Sumiyo Kanai, 935-12 Midori-cho, Hachioji-shi, Japan

[73] Assignees: Sumiyo Kanai, Hachioji; Uni World Japan Co., Ltd., Tokyo, both of Japan

[21] Appl. No.: 345,387

[22] Filed: Nov. 18, 1994

[30] Foreign Application Priority Data

Sep. 1, 1994 [KR] Rep. of Korea .................. 1994-22024

[51] Int. Cl.[6] .................................................. A61C 9/00

[52] U.S. Cl. ....................................... 5/604; 5/605; 4/431

[58] Field of Search ............................. 5/604, 605; 4/431

[56] References Cited

U.S. PATENT DOCUMENTS

| | | | |
|---|---|---|---|
| 815,481 | 3/1906 | Smith | 5/604 |
| 1,869,036 | 7/1932 | Zink . | |
| 1,945,081 | 1/1934 | Ryan et al. . | |
| 2,384,325 | 9/1945 | Marsan | 5/604 |
| 2,500,738 | 3/1950 | Beem . | |
| 2,500,739 | 3/1950 | Beem . | |
| 2,500,740 | 3/1950 | Beam . | |
| 2,500,741 | 3/1950 | Taylor . | |
| 2,500,743 | 3/1950 | Beam et al. . | |
| 3,922,735 | 12/1975 | Kato | 5/605 |
| 3,943,583 | 3/1976 | Ishikawa | 5/605 |
| 4,357,719 | 11/1982 | Badger et al. | 4/431 X |
| 4,631,762 | 12/1986 | Fugett | 5/605 |
| 4,821,348 | 4/1989 | Pauna . | |
| 5,077,845 | 1/1992 | Tokunaga et al. . | |
| 5,245,711 | 9/1993 | Oldfelt et al. | 4/431 X |
| 5,269,030 | 12/1993 | Pahno et al. . | |
| 5,369,911 | 12/1994 | Serre | 4/431 X |
| 5,381,573 | 1/1995 | MacSanz | 5/604 |
| 5,396,668 | 3/1995 | Haatanen | 4/431 |
| 5,438,721 | 8/1995 | Pahno et al. . | |

FOREIGN PATENT DOCUMENTS

| | | |
|---|---|---|
| 0024743A2 | 3/1981 | European Pat. Off. . |
| PCT/DE85/000128 | 11/1985 | Germany . |

*Primary Examiner*—Michael F. Trettel
*Attorney, Agent, or Firm*—Fisher & Associates

[57] ABSTRACT

The present invention enables a bedridden person to perform excretory functions without help from another person. The present invention includes a bed and a movable toilet in which water is provided. A negative pressure propels water and excrements through a bottom hole in a lower part of the toilet, through a valve and to a sanitary container.

4 Claims, 3 Drawing Sheets

EXCRETION APPARATUS COMBINED INTO A BED FOR BEDRIDDEN PERSON

BACKGROUND OF THE INVENTION

Field of the Invention

This invention relates to an apparatus allowing an unassisted bedridden person to discharge excrement while remaining in bed.

SUMMARY OF THE INVENTION

A bedridden person must call for a nurse or helper to help the bedridden person perform excretory functions with a urine bottle or portable toilet. The bedridden person may feel uneasy asking the nurse or helper to then dispose of the matter in the urine bottle or portable toilet. The present invention makes it possible for a bedridden person to excrete without assistance from another person.

To allow a bedridden person to excrete waste without help from another person, a toilet is installed in a bed and is lifted mechanically to a predetermined position where the bedridden person may then use the toilet. After the bedridden person excretes waste, the toilet is lowered and put away under the bed. The excrement in the toilet is drawn into a sanitary container by water provided in the toilet with help from a negative pressure.

DETAILED DESCRIPTION OF THE PREFERRED EMBODIMENT

Figure 1:
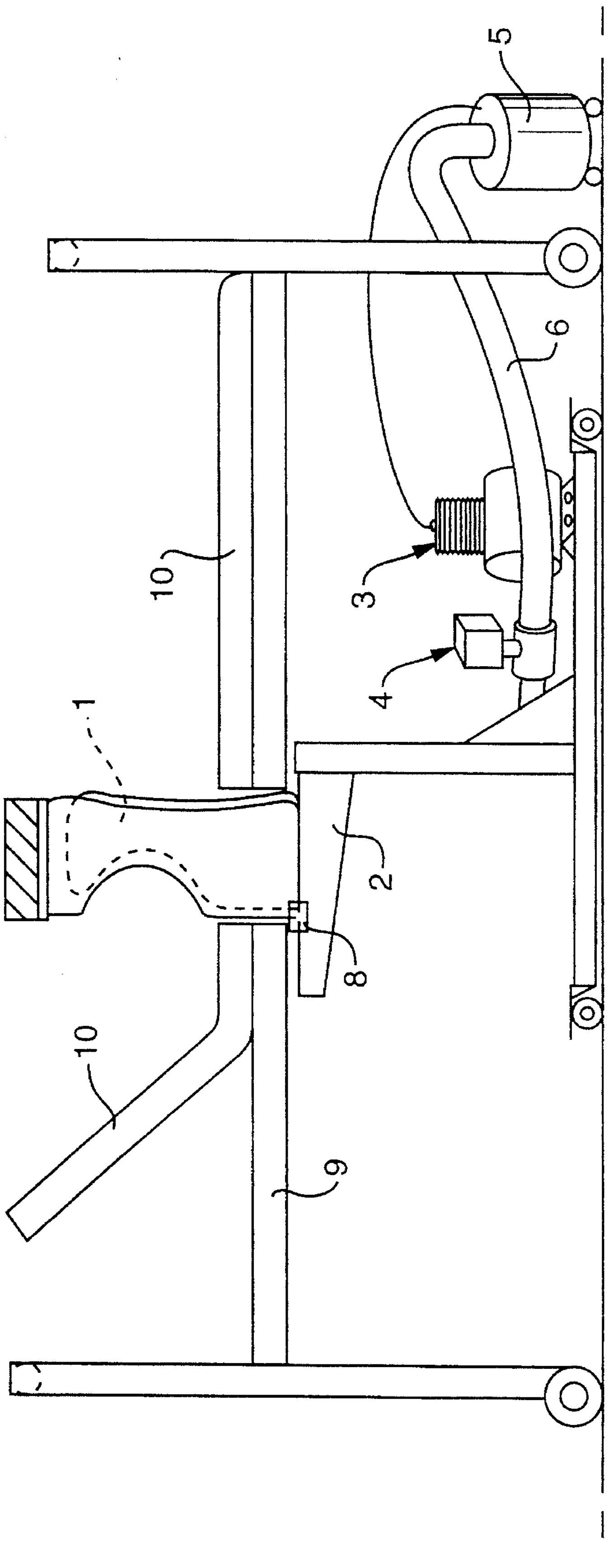
FIG. 1 is a side elevation of an embodiment ready for use.

FIG. 1 is a side elevational view of the present invention in which the present invention is ready for use; wherein toilet 1, elevator 2, vacuum pump 3, valve for delivering excrements 4, sanitary container 5, pipe for delivering excrements 6 and bed 9 are illustrated.

Figure 2:
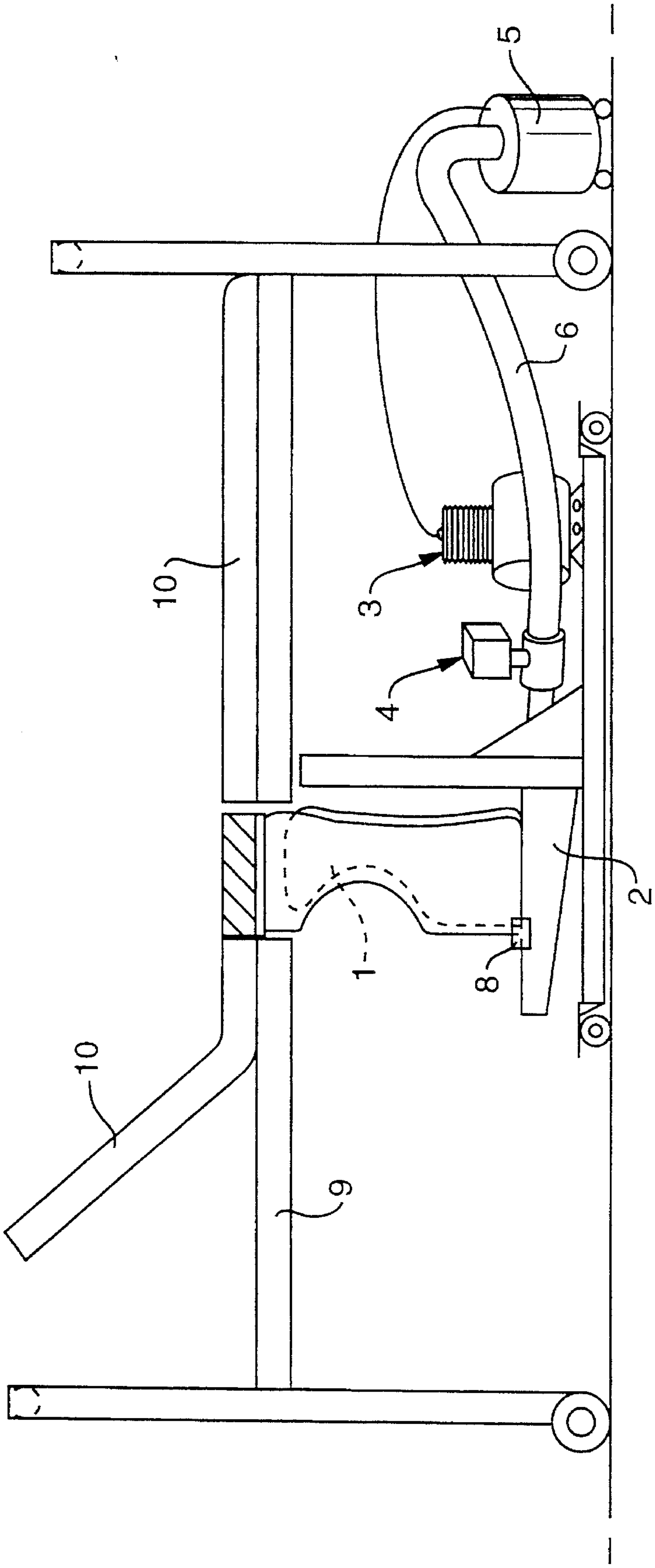
FIG. 2 is a side elevation of an embodiment of the present invention when the toilet is lowered and put away under the bed.

FIG. 2 is a side elevational view of an embodiment in which the present invention in FIG. 1 is not ready for use. Toilet 1 is pulled back under a bed so that an upper surface of the mat at the top of toilet 1 is positioned at a same height as an upper surface of a sleeping pad in the bed. In this manner, the upper surface of the sleeping pad is at the same level as the upper surface of the mat.

Excrement from a human body can be characterized as solid, liquid or an intermediate state between solid and liquid. Liquid or nearly liquid matter may be delivered to sanitary container 5 with water provided in toilet 1 by using negative pressure. However, a problem arises when solid or nearly solid matter is introduced into sanitary container 5.

To deliver solid or nearly solid matter into sanitary container 5, an inner surface of toilet 1 must be previously wetted with water through a water pipe (not shown). Additionally, a predetermined quantity of water must be deposited at an inside lower portion of toilet 1 in order to discharge excrement.

In order to deposit a large quantity of water in toilet 1, toilet 1 must have an excessively large capacity. It is difficult to install an excretion apparatus having such a large toilet under a bed. In contrast, the present invention utilizes approximately 500 cc of water and thereby reduces the excretion apparatus's overall size.

The negative pressure used for transporting water and excrement from toilet 1 to sanitary container 5 should be kept relatively low for several reasons. First, relatively high negative pressures may be dangerous or uncomfortable to a person's body and require a comparatively large amount of time to achieve and maintain. Also, relatively large negative pressures require relatively large vacuum pumps. Large vacuum pumps are undesirably noisy, bulky and expensive. Consequently, the largest useful negative pressure is 500 mmHg.

The diameter of a bottom hole at a lower end of toilet 1 is also an important parameter. This bottom hole allows passage of excrement. When both excrement and water are forced by a negative pressure of 100–500 mmHg, the following results were experimentally obtained. Generally, if the bottom hole at the lower part of toilet 1 has a relatively small diameter, excrement may become stopped up in the bottom hole. A hole in part of the excrement is formed and only water is removed leaving the excrement. Experimental results using 500 cc of water are illustrated in Tables 1 and 2.

TABLE 1

| | | Negative Pressure (mmHg) | | | | | | | | |
|---|---|---|---|---|---|---|---|---|---|---|
| | | 100 | 150 | 200 | 250 | 300 | 350 | 400 | 450 | 500 |
| Diameter of the bottom hole at the lower part of the toilet (φ Mm) | 5 | X | X | X | X | X | Δ | Δ | X | X |
| | 10 | X | X | X | Δ | Δ | O | O | Δ | X |
| | 15 | X | X | X | O | O | O | O | O | X |
| | 20 | X | Δ | Δ | O | O | O | O | O | Δ |
| | 25 | X | O | O | O | O | O | O | O | Δ |
| | 30 | X | Δ | Δ | O | O | O | O | Δ | X |
| | 35 | X | X | X | Δ | O | O | Δ | X | X |
| | 40 | X | X | X | X | Δ | Δ | X | X | X |
| | 45 | X | X | X | X | X | X | X | X | X |
| | 50 | X | X | X | X | X | X | X | X | X |

As evident from Table 1, functional negative pressures range from 150–450 mmHg. A preferable pressure is 400 mmHg. The diameter of the bottom hole at the lower part of toilet 1 should range from 10 to 35 mm with a preferable value of between 20 to 30 mm.

Using data obtained from Table 1, data relating to opening speeds of a valve provided between toilet 1 and sanitary container 5 were obtained for a variety of valves. The most optimal value was determined to be a ball valve with a plunger. When the duration for completely opening the valve was relatively long, only water was drawn and solid substances were drawn with difficulty.

TABLE 2

| | | Negative Pressure at 25 φ mm (mmHg) | | | | | |
|---|---|---|---|---|---|---|---|
| | | 200 | 250 | 300 | 350 | 400 | 450 |
| Duration | 0.2S | O | O | O | O | O | O |
| for | 0.5S | O | O | O | O | O | O |
| opening | 0.7S | Δ | Δ | O | O | O | O |
| the valve | 1.0S | X | X | Δ | O | O | O |
| (S = | 1.2S | X | X | X | Δ | O | O |
| Second) | 1.5S | X | X | X | X | Δ | Δ |
| | 2.0S | X | X | X | X | X | X |

As evident from Table 2, when both of the solid and the water in the toilet were drawn to sanitary container 5 with a negative pressure of 200–450 mmHg, the duration for opening the valve is under 1.0 sec. The optimal duration for completely opening the valve was found to be from 0.2 to 1.0 sec. Preferably, the time should be between 0.2 and 0.5 sec.

Figure 3:
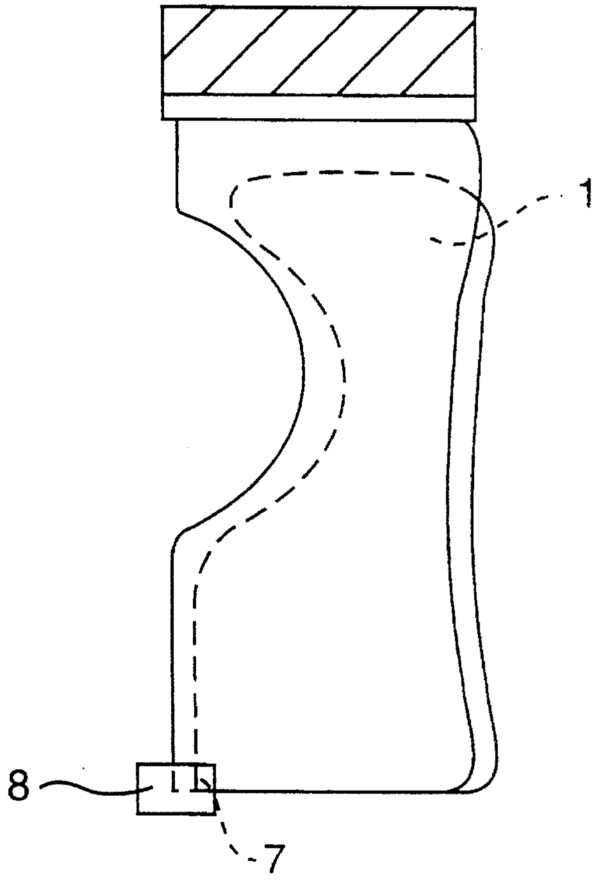
FIG. 3 shows a covering for an opening of the toilet.

FIG. 3 illustrates a cover to overlay an upper opening of toilet 1 to prevent emitting an odor from toilet 1. A mat is also provided at a top part of toilet 1. As stated above, the mat is at a same level as an upper surface of a sleeping pad when toilet 1 is lowered under bed 9. In order to raise toilet 1 to an operative position, the mat and the cover must be taken away from the bed.

Figure 4:
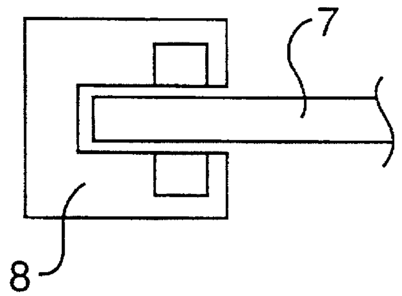
FIG. 4 details a safety device, wherein a toilet 1, a lift 2, a vacuum pump 3, a pump or delivering excrements 4, a sanitary container 5, a pipe for delivering excrements 6, a safety switch operation for a cover 7, a safety switch 8, a bed 9 and a mat 10 are illustrated.

As shown in 7 of FIG. 4, the present invention also has a photoelectric switch 8 under a projection of the cover. Photoelectric switch 8 operates a safety device to prevent toilet 1 from lowering or generating excessive negative pressure. Photoelectric switch 8 prevents accidents from lowering toilet 1 under the bed and accidentally catching a part of the person's body or drawing a portion of the person's body into toilet 1.

Furthermore, a nozzle for washing relevant portions of the person's body after excretion may be installed in toilet 1. Additionally, toilet 1, when raised, may be moved horizontally in the direction of the person's head for optimal positioning of the present invention relative to the person.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. An excretion apparatus and bed for bedridden people, comprising;

a sleeping pad;

a toilet having a mat on a top surface of said toilet, wherein a top surface of said mat is level with a top surface of said sleeping pad when said toilet is in a lowered position:

a sanitary container communicating with said toilet;

an openable cover for overlaying an upper opening of said toilet;

a means for generating a negative pressure between said toilet and said sanitary container, wherein said negative pressure delivers excrements and fluid from said toilet to said sanitary container; and a means for positioning said toilet at said lowered position and for lifting said toilet to a raised position when said toilet is in use.

2. An excretion apparatus and bed as claimed in claim 1, wherein a safety mechanism prevents said toilet from lowering when said cover is in an open position.

3. An excretion apparatus and bed as claimed in claim 1, further comprising:

a valve between said toilet and said sanitary container;

wherein said safety mechanism prevents said valve from opening when said cover is in said open position.

4. An excretion apparatus and bed as claimed in claim 1, wherein said safety mechanism prevents said negative pressure from delivering said excrements and fluid when said cover is in said open position.

* * * * *